Jan. 5, 1926.
J. W. KOHLHEPP
1,568,282
CARCASS SCALDING MACHINE
Filed Sept. 19, 1925    3 Sheets-Sheet 2
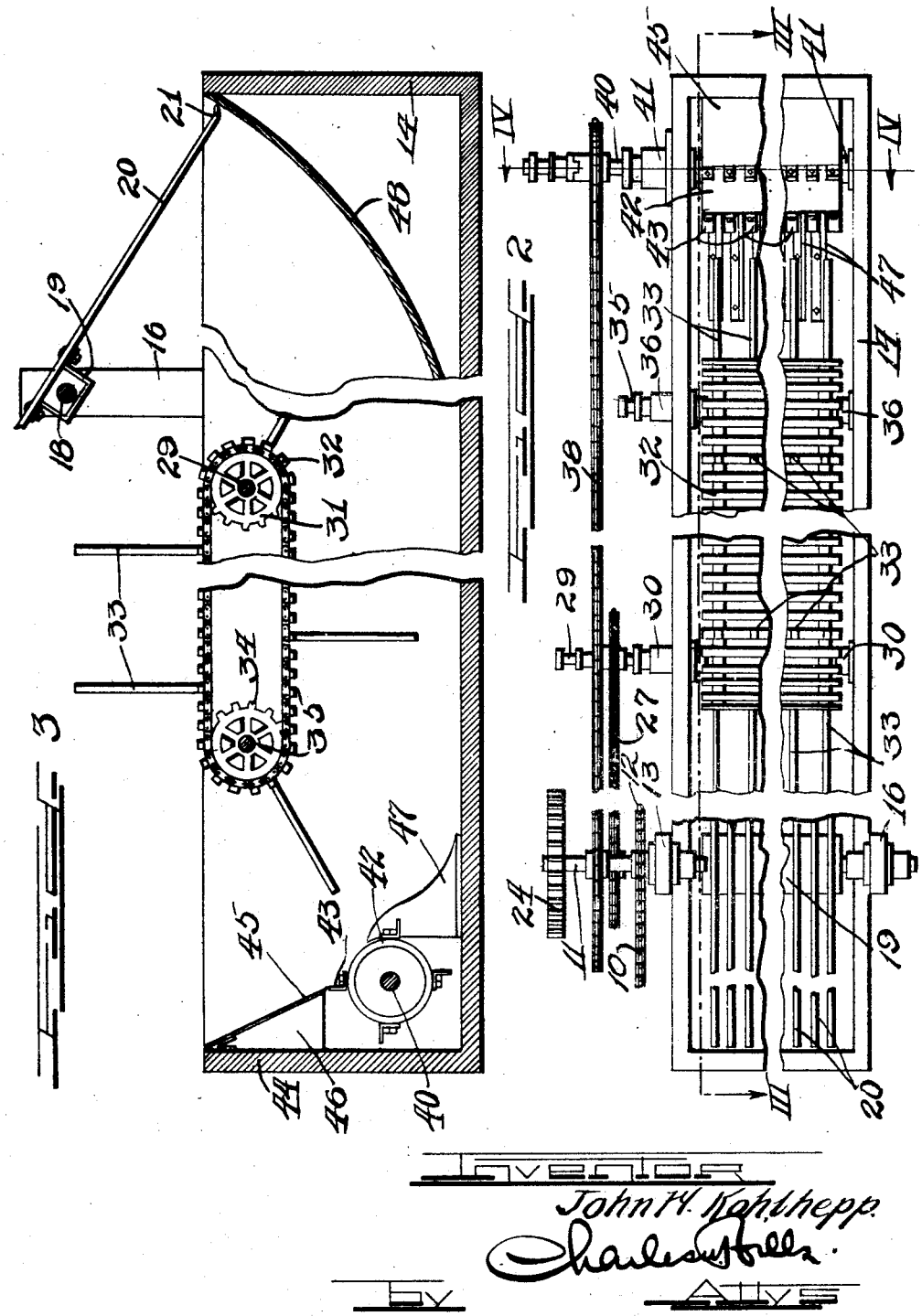

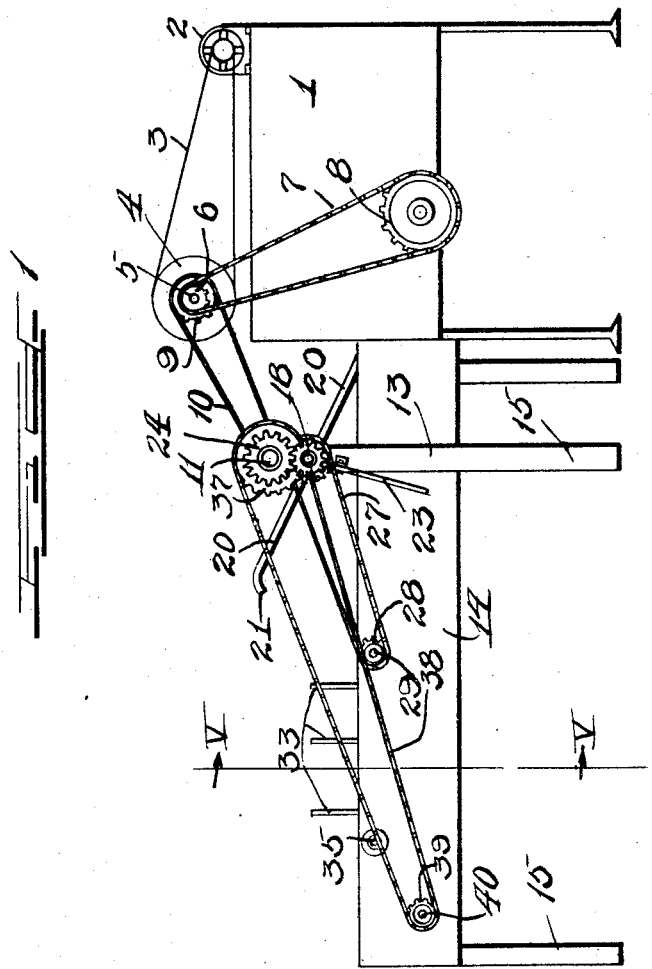

Jan. 5, 1926.  1,568,282
J. W. KOHLHEPP
CARCASS SCALDING MACHINE
Filed Sept. 19, 1925   3 Sheets-Sheet 3
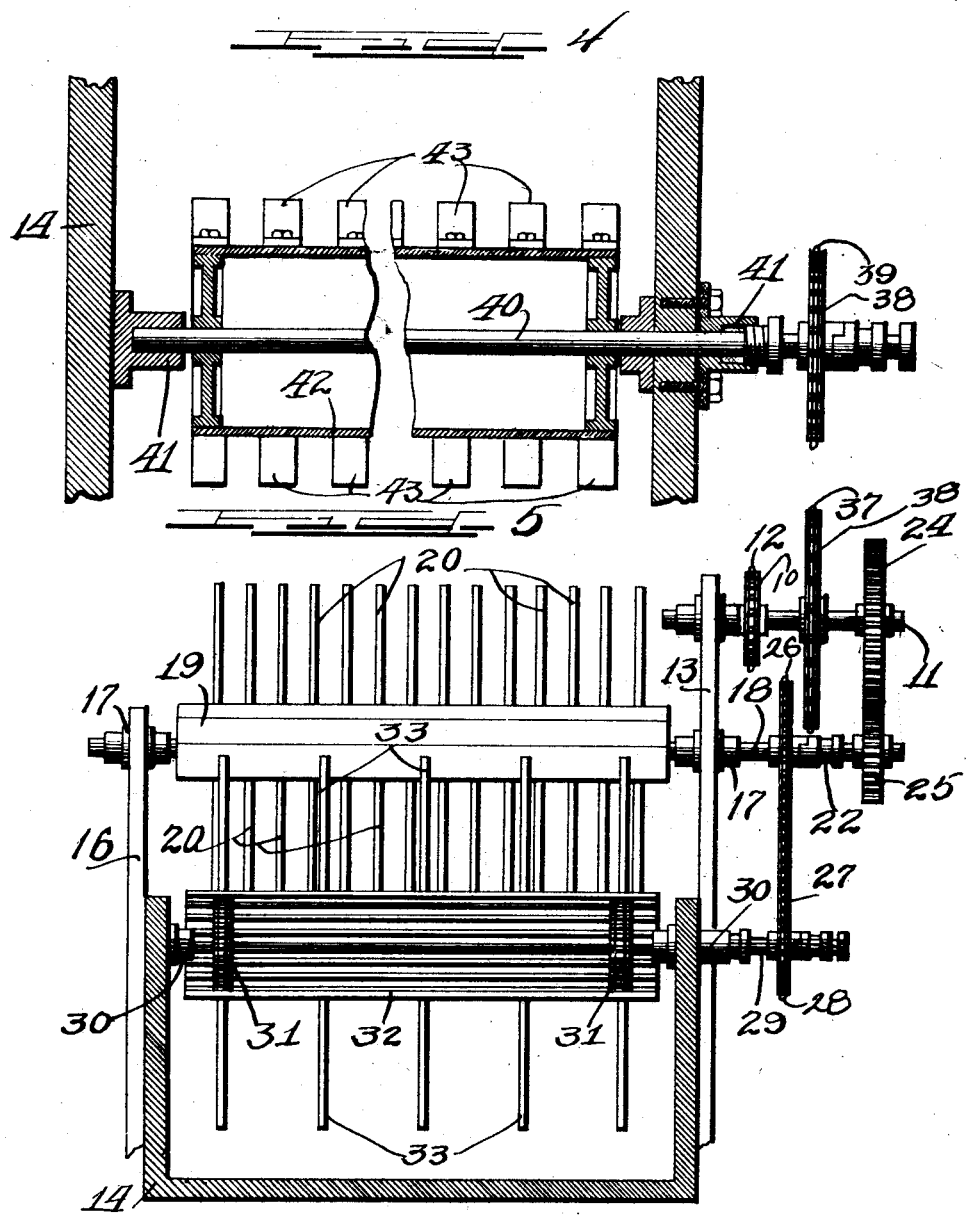

Patented Jan. 5, 1926.

1,568,282

UNITED STATES PATENT OFFICE.

JOHN W. KOHLHEPP, OF CHICAGO, ILLINOIS.

CARCASS-SCALDING MACHINE.

Application filed September 19, 1925. Serial No. 57,266.

*To all whom it may concern:*

Be it known that I, JOHN W. KOHLHEPP, a citizen of the United States, and a resident of the city of Chicago, in the county of Cook and State of Illinois, have invented certain new and useful Improvements in a Carcass-Scalding Machine; and I do hereby declare that the following is a full, clear, and exact description of the same, reference being had to the accompanying drawings, and to the numerals of reference marked thereon, which form a part of this specification.

This invention relates to a carcass scalding and dehairing machine and more particularly to improvements in the scalding apparatus which is so constructed that carcasses delivered into the receiving end of a scalding vat are adapted to be delivered over guide aprons and automatically fed into the field of operation of a conveyor mechanism which conducts the carcasses through the vat into a position adapted to be engaged by delivery means, which when actuated permit a group of carcasses to be transferred from the scalding vat into the dehairing machine.

It is an object of this invention to provide an improved carcass scalding machine which will thoroughly and uniformly scald carcasses while being transferred through the scalding vat for delivery to a dehairing machine.

It is also an object of this invention to provide an improved scalding machine having means for conducting carcasses through the vat and into a position for discharge into a dehairing machine.

It is a further object of this invention to provide a carcass scalding machine with improved means for automatically feeding carcasses therethrough into a position to be engaged by manually governed delivery devices which act to remove the carcasses, when scalded, from the vat.

It is an important object of this invention to provide a carcass scalding and dehairing machine wherein the scalding vat is equipped with improved carcass conducting devices which will not only insure the proper conducting of the carcasses through the vat, but will also serve as a means for uniformly scalding all parts of the carcasses before the carcasses are engaged by means for lifting the scalded carcasses from the vat for delivery into a dehairing machine.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a carcass dehairing machine and a carcass scalding machine, said scalding machine embodying the principles of this invention.

Figure 2 is a fragmentary top plan view of the scalding machine with parts broken away.

Figure 3 is a fragmentary longitudinal section of the scalding machine taken on the line III—III of Figure 2.

Figure 4 is a fragmentary transverse section taken on the line IV—IV of Figure 2.

Figure 5 is an enlarged transverse section taken on line V—V of Figure 1 with parts omitted.

As shown on the drawings:

The reference numeral 1 indicates a carcass dehairing machine of any desired type having mounted thereon a driving motor 2 adapted to drive an endless belt 3 which is trained around a pulley wheel 4 supported on a shaft 5 disposed transversely upon the top of the machine 1. A sprocket 6 is secured on the shaft 5 and has trained therearound a chain 7 which is also engaged around a sprocket 8 to permit a drive from the motor to be transmitted to the dehairing mechanisms within the machine 1.

Also secured on the shaft 5 to the inside of the sprocket 6 is a sprocket 9 which drives a chain 10. The chain 10 is engaged around a sprocket 12 mounted on a stub shaft 11 journalled in a suitable bearing carried in the upper end of an upright bracket 13. The bracket or upright 13 is rigidly secured on one side of a long scalding tank or vat 14, one end of which is positioned adjacent the feeding end of the carcass dehairing machine 1. The scalding tank or vat 14 is supported by means of legs 15. Secured to the opposite side of the scalding tank 14 and opposite the upright bracket 13 is a second upright bracket 16. Journalled in suitable bearings 17 on the upright brackets 13 and 16 is a transversely disposed shaft 18 on which a rectangular sleeve 19 is secured above the discharge end of the scalding vat 14. Rigidly secured to the sleeve 19 are a plurality of parallel arms or bars 20 which project equally on opposite sides of said sleeve 19 and afford a double acting rotatable carcass lifting grate or cradle. The tips of the tines 20 are slightly tapered and bent as indicated at 21.

Mounted on the shaft 18 is a clutch mechanism 22 controlled by means of a handle 23 for the purpose of governing the operation of the rotatable carcass lifting grate 20. Mounted on the driving stub shaft 11 is a large gear 24 which meshes with a smaller gear 25 on the shaft 18. Also mounted on the shaft 18 is a sprocket 26 around which an endless chain 27 is trained. The chain 27 is also trained around the sprocket 28 mounted on one end of a conveyor shaft 29 which is positioned transversely within the scalding tank or vat 14 and has the ends thereof journalled in suitable bearings 30.

Also mounted on the conveyor shaft 29 within the scalding tank are a pair of sprockets 31 around which an endless conveyor 32 is engaged. The conveyor 32 has a plurality of transverse rows of outwardly projecting arms or fingers 33 adapted to be used for the purpose of engaging and feeding carcasses through the scalding tank. The conveyor 32 is also trained around the second pair of sprockets 34 mounted on a shaft 35 which is also disposed transversely within the upper portion of the scalding tank 14 and has the ends thereof supported in suitable bearings 36 mounted on said tank.

Also rigidly secured on the stub shaft 11 is a large sprocket 37 around which an endless chain 38 is trained. The chain 38 also passes around a smaller sprocket 39 which is engaged on one projecting end of a shaft 40 which projects transversely through a lower portion of the entrance end of the scalding tank 14 and is journalled in suitable bearings 41.

Mounted on the shaft 40 within the tank 14 is a drum 42 having a plurality of longitudinal rows of fingers or teeth 43 mounted thereon and extending outwardly from the peripheral surface thereof.

Pivotally or hingedly mounted on the inner face of the end wall 44 of the scalding tank 14 is a carcass guide plate or apron 45 which projects downwardly in an inclined position to a point above the carcass feed drum 42 as clearly illustrated in Figure 3. Mounted within the scalding tank 14 upon the inner face of the end wall 44 are a pair of triangular blocks 46 against which the apron 45 is adapted to rest and be positioned in an inclined position. The inclined apron 45 serves as a means for guiding or directing carcasses which are deposited in the tank into a position upon the carcass feed drum 42, the teeth 43 of which act to feed the carcasses downwardly into the scalding tank over a stationary guide grid or apron 47 which is secured on the bottom of the scalding tank 14 and comprises a plurality of parallel upright members positioned transversely of the machine and projecting between the teeth 43 of the carcass feed drum 42.

Also mounted in the discharge end of the scalding tank 14 is an upwardly curved apron or chute 48 over which the carcasses are adapted to be guided before being discharged from the tank.

The operation is as follows:

The scalding tank 14 is adapted to be filled with hot water or a scalding solution up to a selected level and when the motor 2 is set in operation the drive from said motor is transferred by means of the drive chain 3 to the pulley 4 and to the shaft 5, from which point the drive is transmitted to the carcass dehairing mechanism within the carcass dehairing machine 1 and by means of the chain 3 to the driving mechanisms of the scalding tank. With the rotation of the stub shaft 11 by the endless chain 10 as described, the endless conveyor 32 is operated by means of the driving chain 27 while the carcass feed drum 42 is operated by means of the endless chain 38. The carcass lifting grate is held in the position shown in Figure 3 against movement by having the control clutch 22 thrown out. This is done by means of the control lever 23 which is adapted to be operated by an attendant.

With the machine set in operation as described, a plurality of carcasses to be scalded and dehaired are deposited in the receiving end of the tank 14 and are permitted to drop one at a time onto the guide apron 45 from which point the carcasses are guided into the field of operation of the rotatable feed drum 42, the teeth 43 of which act to engage the carcass and thereby feed the same downwardly into the tank over the stationary guide grid or apron 47. The carcasses passing over the stationary guide grid 47 are thus delivered into the lower part of the tank and are positioned in the path of movement of the fingers or arms 33 of the rotatable conveyor 32. The arms 33 thus act to carry the carcasses from the stationary apron or grid 47 through the lower part of the scalding tank so that all parts of the carcass are uniformly and thoroughly scalded while being completely submerged and conveyed through the scalding tank onto the curved discharge chute or apron 48.

After the carcasses have been thoroughly scalded and are permitted to accumulate on the discharge chute 48, the attendant manually operates the clutch lever 23, thereby throwing the clutch 22 in, permitting the drive to be transmitted to the shaft 18 to cause rotation of the carcass lifting grate 20. It will thus be seen that one side of the grate 20 is moved upwardly away from the discharge end of the scalding tank 14 while the other side of the lifting grate moved downwardly into the tank in back of the group of carcasses on the chute 48 engaging said carcasses and lifting or carrying the same upwardly over the chute out of the discharge end of the scalding tank 14. The thoroughly scalded carcasses lifted from the tank 14 are now discharged into the entrance end of the carcass dehairing machine 1 in which the carcasses are adapted to be thoroughly dehaired and cleaned.

The operation of the lifting grate 20 is manually controlled by means of the clutch which is operated by the attendant so that any desired number of carcasses may be conveyed or lifted from the tank 14 after which the carcasses are delivered into the dehairing machine.

The scalding machine affords an improved means whereby carcasses which are to be scalded may be automatically conveyed through the scalding vat or tank by means of the improved feed drum 42 and the endless conveyor 32, the arms 33 of which are adapted to engage carcasses which are delivered over the aprons 45 and 47 and then move said carcasses through the vat without any chance of any of the carcasses remaining in the bottom of the vat.

The improved scalding vat affords a means whereby the carcasses are completely submerged during their progress through the scalding tank, said conveyor mechanism preventing the carcasses from floating upwardly in the scalding solution, thereby preventing parts of the carcasses from moving upwardly out of the solution to prevent scalding thereof.

The carcasses may be conducted through the scalding tank individually or in groups as desired. The carcasses may be furthermore removed from the scalding tank individually or in groups by the lifting grate 20 which is controlled by the operator.

The entrance guide apron 45 is pivotally mounted in position to permit the same to be lifted to facilitate cleaning of the feed drum 42.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. The combination with a carcass dehairing machine, of a carcass scalding unit comprising a scalding tank, a carcass feed drum rotatably mounted in one end thereof, a carcass discharge guide chute in the opposite end thereof, carcass guide aprons associated with the carcass feed drum to guide carcasses downwardly into the tank, a conveyor mechanism in the tank between the carcass feed drum and said chute to convey the carcasses from said aprons in a submerged condition through the lower part of the tank and onto said chute, and rotatable means adapted to enter the tank to engage and lift the scalded carcasses from said chute and deposit the same in said dehairing machine.

2. A carcass scalding machine comprising a tank, a carcass feed drum rotatably mounted therein, a carcass guide apron positioned above said feed drum, a second carcass guide apron mounted in said tank adjacent one side of said feed drum, a carcass conveying mechanism adapted to engage carcasses fed forwardly by said feed drum to convey said carcasses in a completely submerged condition through said tank, means for lifting the scalded carcasses from said tank, and mechanisms for driving said lifting means, said conveyor and said drum.

3. A carcass scalding machine comprising a scalding tank, a carcass feed drum therein, over which the carcasses are adapted to pass, a stationary apron mounted on the floor of said tank and interfitting with said feed drum, a guide apron above said feed drum for guiding carcasses onto said drum for delivery over said stationary apron to the bottom of said tank, and a conveyor mechanism operable in said tank for moving the carcasses from said stationary apron through the bottom of said tank in a completely submerged condition to uniformly and thoroughly scald the carcasses.

4. A carcass scalding machine comprising a scalding tank, a carcass feed drum therein, guide aprons associated with said feed drum to permit carcasses to be delivered into the tank, a conveyor in said tank adapted to engage and move the carcasses through the bottom of said tank to uniformly scald the carcasses, mechanisms for driving said conveyor and said feed drum, a chute for receiving the scalded carcasses from said conveyor, a lifting mechanism adapted to lift the carcasses from said chute to discharge the same from said tank, and a clutch mechanism controlling said lifting mechanism to permit operation of said lifting mechanism at predetermined times.

5. A carcass scalding machine comprising a scalding tank, a pivoted carcass guide apron therein, a carcass feed drum associated with said apron for feeding carcasses downwardly into the machine, a stationary apron in said tank interfitting said drum, conveyor mechanisms for moving the carcasses through the machine into a discharge position, and means for operating said feed drum and said conveyor mechanism.

6. A carcass scalding machine comprising a scalding tank, a conveyor mechanism therein for moving carcasses through the tank, a feed device in said tank for feeding carcasses into the field of operation of said conveyor mechanism, a stationary guide apron between the conveyor mechanism and said feed device, and a pivotally mounted guide apron above said feed device for guiding carcasses onto the feed device.

7. A carcass scalding machine comprising a scalding tank, a carcass feed means rotatably mounted therein, a pivotally mounted carcass guide chute positioned above said feed means, and a stationary carcass guide mounted in said tank and interfitting with said feed means.

8. A carcass scalding machine comprising a scalding tank, a carcass feed means rotatably mounted in one end thereof, a carcass discharge chute mounted in the other end of said tank, a stationary carcass guide mounted in said tank and interfitting with said feed means, and a pivotally mounted carcass guide chute positioned above said feed means for delivering carcasses over said feed means and onto said stationary guide.

9. A carcass scalding machine comprising a scalding tank, a carcass feed means rotatably mounted in one end thereof, a discharge chute mounted in the other end of said tank, a stationary apron mounted in said tank and interfitting said feed means, a pivoted apron in said tank above said feed means for delivering carcasses over said feed means and onto said stationary chute, and conveyor mechanisms in said tank for moving the carcasses from said stationary chute through the tank and onto said discharge chute.

10. A carcass scalding machine comprising a scalding tank, a rotatable carcass feed means in one end thereof, a carcass discharge chute in the other end of said tank and conveyor mechanisms between said rotatable feed means and said discharge chute for delivering the carcasses from said carcass feed means through the tank and onto said discharge chute.

In testimony whereof I have hereunto subscribed my name.

JOHN W. KOHLHEPP.